C. H. HAPGOOD.
SEPARATOR FOR LIQUIDS.
APPLICATION FILED SEPT. 4, 1912.
1,081,936.
Patented Dec. 16, 1913.
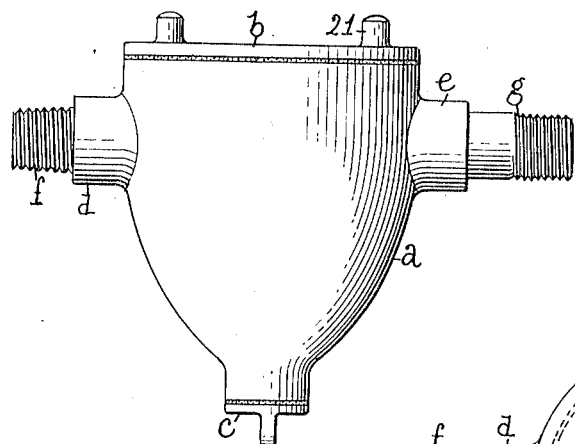
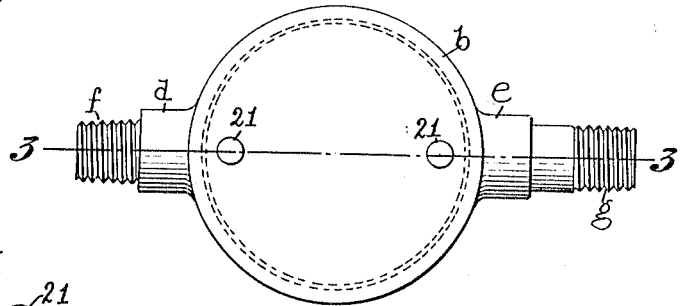
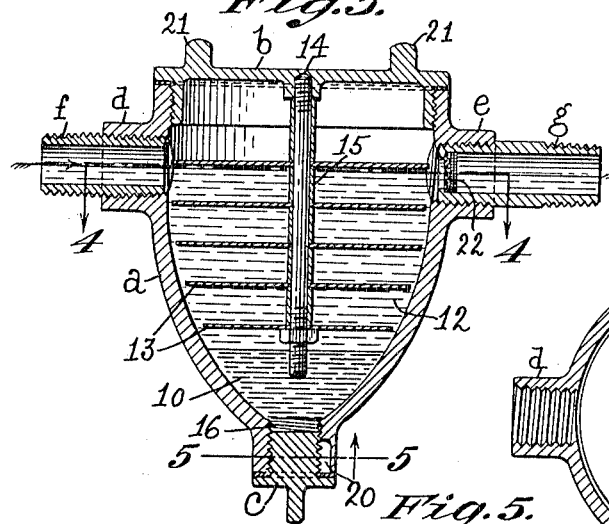
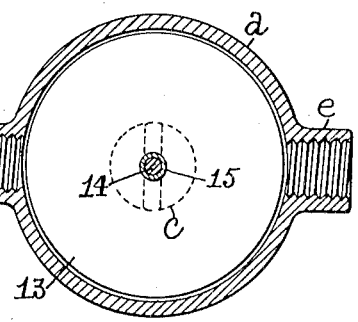
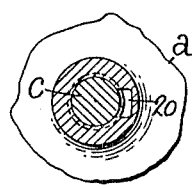
Witnesses:
Inventor:
Cyrus H. Hapgood
by Jas. H. Churchill
Atty.

UNITED STATES PATENT OFFICE.

CYRUS H. HAPGOOD, OF BOSTON, MASSACHUSETTS, ASSIGNOR, BY MESNE ASSIGNMENTS, TO PARKER CARBURETER COMPANY. OF BOSTON, MASSACHUSETTS, A CORPORATION OF MASSACHUSETTS.

SEPARATOR FOR LIQUIDS.

1,081,936.      Specification of Letters Patent.      Patented Dec. 16, 1913.

Application filed September 4, 1912. Serial No. 718,494.

*To all whom it may concern:*

Be it known that I, CYRUS H. HAPGOOD, a citizen of the United States, residing in Boston, county of Suffolk, and State of Massachusetts, have invented an Improvement in Separators for Liquids, of which the following description, in connection with the accompanying drawings, is a specification, like letters on the drawings representing like parts.

This invention relates to a separator for liquids of different specific gravities, which is especially applicable for use on automobiles and like vehicles, for separating water from the gasolene which is used as the motive fluid. To this end, I employ a separator comprising a vessel having near its upper end an inlet pipe and an outlet pipe for the gasolene, and containing preferably a series of horizontally arranged disks or baffle plates, which are spaced apart and mounted on a common stem or rod, which may and preferably will be secured to a removable cover for the vessel.

Figure 1 is a side elevation of a separator embodying this invention. Fig. 2, a plan of the separator shown in Fig. 1. Fig. 3, a section on the line 3—3, Fig. 2. Fig. 4, a section on the line 4—4, Fig. 3, and Fig. 5, a detail to be referred to.

Referring to the drawings, *a* represents a vessel of aluminum or other suitable material, which is preferably substantially conical or tapering in from as herein shown, and is provided with an open upper end or top, which is normally closed liquid-tight by a cover or cap *b*. The vessel *a* is also provided at its lower end or bottom with an opening which is normally closed by a removable plug *c*. The vessel *a* is further provided near its upper end with hollow bosses *d, e*, which constitute respectively a liquid inlet and a liquid outlet for said vessel, and with which are connected threaded nipples or pipe sections *f, g*, which in practice are connected by suitable pipes, not shown, with the gasolene supply tank and with the carbureter, (both not shown), but such as are now used on automobiles, so that the vessel *a* forms part of the pipe connection between the supply tank and the carbureter, and practically forms a trap in the pipe connection, so that any water in the gasolene may descend to the bottom of the vessel *a* and accumulate therein and be thus separated from the gasolene, which floats on the water and runs out of the vessel *a* through the nipple *g*.

In Fig. 3, a quantity of water, marked 10, is represented as separated from the body of gasolene 12 resting thereon and filling the vessel *a* up to the level of the outlet pipe *g*. To prevent the body of water 10 from being again mixed with the body 12 of gasolene, when the automobile is in motion and the vessel *a* is being subjected to a jarring action and vibration, I have provided one or more baffle plates or disks 13, which are mounted on a rod 14 and are spaced apart by sleeves 15 on said rod, which is preferably secured to the cover *b*, so that the baffle plates or disks 13 may be lifted out of the vessel when the said cover is removed, namely, when it is desired to clean the vessel *a* of any dirt which may accumulate therein.

The baffle plates or disks 13 are preferably made to conform to the shape of the vessel *a* and are also made of substantially the internal diameter of the vessel *a*, so as to leave only a small space between the circumference of the disks or plates 13 and the vessel *a*. A restricted opening is thus formed between the baffle plates and the vessel *a*, which serves to prevent the water 10 from being mixed in any considerable amount with the body 12 of gasolene, by the vibration or jar imparted to the vessel *a* when the automobile is running and especially running over poor roads, cross-walks and other obstacles.

The wall of the discharge opening 16 in the bottom of the vessel *a*, may be provided with a passage 20, which is capable of being uncovered at its upper end by the plug *c* without removing the latter from the vessel *a*. The cover *b* may be provided with nubs 21 to facilitate removal of the same. The outlet nipple *g* may and preferably will be provided with a screen or strainer 22 of wire gauze to prevent any dirt passing from the vessel *a* to the carbureter.

From the above description, it will be seen that any water in the gasolene admitted into the vessel *a* will accumulate in the lower end of the vessel and the pure gasolene will float on the body of water and pass out of the vessel through the outlet pipe *g*.

Claims.

1. In a separator of the character described, in combination, a vessel provided with a removable cover at its upper end and with a liquid outlet near its lower end, and having a liquid inlet and a liquid outlet near its upper end, a plurality of baffle plates located in said vessel, and a rod on which they are mounted, said rod being detachably secured to said cover.

2. In a separator of the character described, in combination, a vessel provided with a removable cover at its upper end and with a liquid outlet near its lower end, and with a liquid inlet and a liquid outlet above the first-mentioned liquid outlet, a rod depending from said cover and a baffle plate supported by said rod and extended transversely of the said vessel, for the purpose specified.

3. In a separator of the character described, in combination, a vessel provided with a removable cover at its upper end and with a liquid outlet near its lower end, and with a liquid inlet and a liquid outlet above the first-mentioned liquid outlet, a baffle plate located in said vessel and arranged transversely of the latter, and means to support said baffle plate from said cover to enable the former to be removed with the latter, substantially as described.

4. In a separator of the character described, in combination, a vessel provided with a removable cover at its upper end and with a liquid outlet near its lower end, and having a liquid inlet and a liquid outlet near its upper end, a plurality of baffle plates located in said vessel and arranged transversely thereof, and a support for said baffle plates upon which the latter are arranged to extend transversely of the said vessel.

In testimony whereof, I have signed my name to this specification in the presence of two subscribing witnesses.

CYRUS H. HAPGOOD.

Witnesses:
 EDWARD J. REILLY,
 M. NYMETE.